United States Patent
Zadra et al.

(10) Patent No.: US 6,248,275 B1
(45) Date of Patent: Jun. 19, 2001

(54) PROCESS FOR SYNTHESIZING COMPOSITE MATERIAL COMPONENTS WITH CURVED SURFACES

(75) Inventors: Dennis D. Zadra, Pasadena; Deborah A. Houghton, Annapolis; Vincent J. Castelli, Severna Park, all of MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/342,206

(22) Filed: Jun. 29, 1999

(51) Int. Cl.[7] .................................................. B29C 70/66
(52) U.S. Cl. ..................... 264/112; 264/109; 264/250; 264/264; 264/257; 264/510; 264/DIG. 6
(58) Field of Search ..................................... 264/510, 511, 264/257, 258, 264, DIG. 6, 250, 109, 112

(56) References Cited

U.S. PATENT DOCUMENTS

| | | | |
|---|---|---|---|
| 3,353,981 | * 11/1967 | Jacob | 442/136 |
| 3,622,437 | * 11/1971 | Hobaica et al. | 114/69 |
| 3,996,654 | * 12/1976 | Johnson | 29/458 |
| 4,468,363 | * 8/1984 | Miessler | 264/128 |
| 4,560,523 | * 12/1985 | Plumley et al. | 264/102 |
| 4,861,649 | * 8/1989 | Browne | 428/240 |
| 5,025,849 | 6/1991 | Karmarkar et al. . | |
| 5,120,769 | * 6/1992 | Dyksterhouse et al. | 521/54 |
| 5,432,205 | * 7/1995 | Arnold, Jr. et al. | 521/54 |
| 5,665,461 | * 9/1997 | Wong et al. | 523/218 |
| 5,665,787 | * 9/1997 | Nowak et al. | 521/54 |
| 6,068,915 | * 5/2000 | Harrison et al. | 428/313.5 |

* cited by examiner

Primary Examiner—Jan H. Silbaugh
Assistant Examiner—Stefan Staicovici
(74) Attorney, Agent, or Firm—John Forrest; Jacob Shuster

(57) ABSTRACT

A slurry mixture of alcohol, particles and a binding agent undergoes partial solidification and curve-shaped molding in sequence on flat and curved molding surfaces respectively, to produce a curve-shaped foam product suitable for further fabrication as components of curved structures. The flat molding surface is lined with a release cloth on which the slurry initially undergoes partial solidification and is then molded as flexible core material transferred to the curved molding surface for additional shape molding purposes while alcohol removal is completed by evaporation followed by resin filling infusion to form a composite core as the curve-shaped foam product.

5 Claims, 2 Drawing Sheets

PROCESS FOR SYNTHESIZING COMPOSITE MATERIAL COMPONENTS WITH CURVED SURFACES

The present invention relates in general to the manufacture of composite material components, such as syntactic foam cores.

BACKGROUND OF THE INVENTION

The formation of foam core types of composite material components from a slurry mixture by means of a molding process, is generally well known in the art. For the manufacture of foam core structures having complex curved shapes, performance of such molding processes is time consuming and expensive because of the required utilization of special molds. It is therefore an important object of the present invention to provide for a more economical and less time consuming type of molding process through which curve-shaped foam core types of composite material components may be synthesized from slurry mixtures.

SUMMARY OF THE INVENTION

In accordance with the present invention, a slurry mixture formulated from alcohol and microsphere particles having some binding agent therein, initially undergoes partial solidification on a flat molding surface lined with a release cloth. Such molding is performed during a period of 2 hours for example, to accommodate partial evaporation of the alcohol therefrom and to produce a partially solidified material having desired flexibility and non-cracking properties. Such initially molded, flexible material is transferred with its underlying release cloth from the flat surfaced mold to a curved-shaped molding surface, after inverting of the material to expose the release cloth lining on top thereof. The partially solidified material then undergoes additional drying after application to the curved molding surface until all of the alcohol is evaporated. Resin infusion is then performed while the material is held on the curved surface by a cover, resulting in a foam type of composite core product suitable for further fabrication as a curve shaped structural component.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein.

DETAILED DESCRIPTION OF PREFERRED EMBODIMENT

Figure 1:
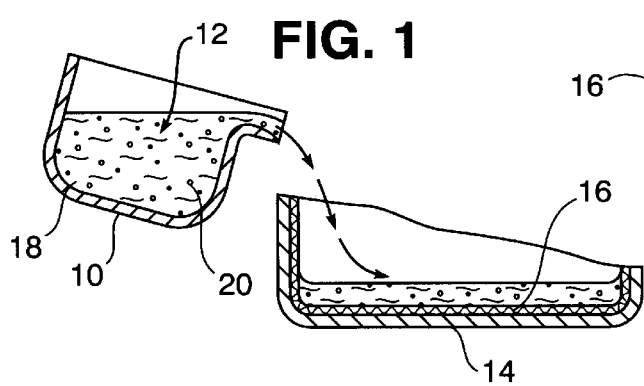
FIGS. 1–4 are simplified side section views respectively illustrating performance of sequential stages of the molding process associated with the present invention.

Referring now to the drawing in detail, FIG. 1 illustrates a container 10 from which a slurry mixture 12 is poured into an open flat surfaced mold 14, lined with a release agent cloth 16 made of a resin transfer fabric. The slurry mixture 12 is formulated from an alcohol liquid 18 within which microsphere particles 20 are disposed. Also, a small amount of a binding agent 21 as diagrammed in FIG. 6 is added to the slurry mixture 12 to impart a "green strength" property thereto, thereby accommodating partial solidification.

The foregoing referred to slurry mixture 12 according to one embodiment of the invention was formulated by use of 99% Isopropyl alcohol for the liquid 18 into which the particles 20 in the form of hollow glass microballoons, are disposed. The quantity of such particles 20 in the liquid 18, of approximately 60–70 microns in size, correspond to a weight percentage of 25% of such liquid. As to the binding agent 21 an organic anti-settling agent RHEOX was utilized in the amount of 1–2% by weight of the mixture 12 to establish the desired property. Such binding agent 21 was dispersed within a small portion of the alcohol before the remaining alcohol and particles 20 were added to the liquid for mixing by means of non-shearing equipment. Such mixing was performed until good dispersal was achieved, involving at least 15–20 minutes mixing time in the formation of the mixture 12.

Figure 2:
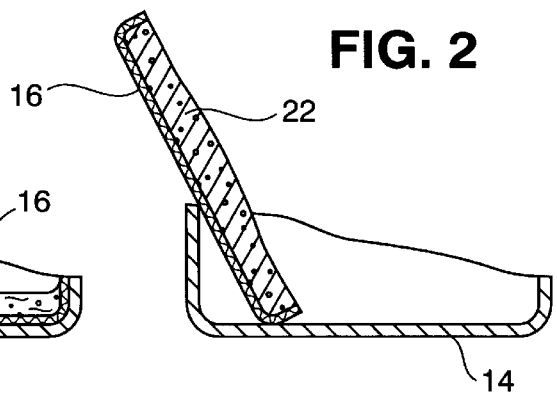
Figure 3:
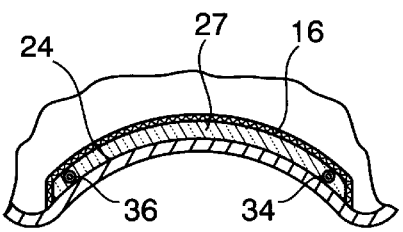
Figure 4:
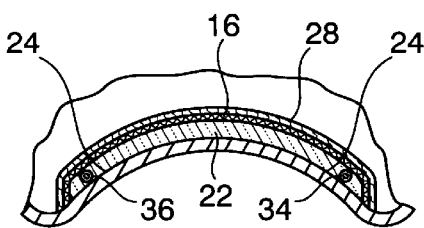
Figure 5:
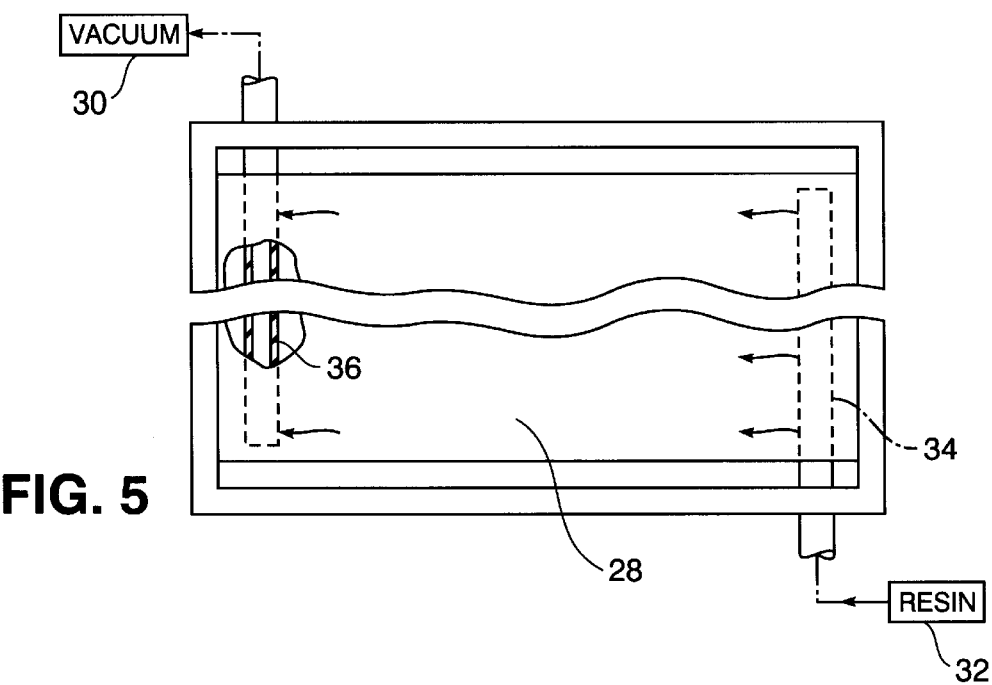
FIG. 5 is a partial top plan view of the apparatus shown in FIG. 4.

With continued reference to FIGS. 1 and 2, after being poured into the flat mold 14, evaporation of the alcohol in the slurry mixture 12 is allowed to begin while the slurry mixture undergoes an initial molding phase of the process for a period of about 2 hours before it is partially solidified into a core moldable material 22 as shown in FIG. 2. Such partially solidified material 22 which is flexible and does not crack, is then lifted off the flat bottom molding surface of the mold 14 for transfer therefrom with the release agent cloth 16. The core material 22 is then placed on a curved molding surface 24 upside down with the release cloth 16 exposed on top thereof as shown in FIG. 3. The remaining alcohol within the material 22 is then allowed to evaporate through the lining cloth 16. The material 22 with the lining cloth 16 thereon is then sealed onto the curved mold surface 24 within a vacuum bag cover 28 so that it may be evacuated by connection to a vacuum source 30 in order to induce infusion of resin into the material 22 from an external resin source 32 through a perforated tube 34 spaced by the material 22 from a perorated tube 36 connected to the vacuum source 30, as shown in FIGS. 4 and 5. The core material 22 when filled with resin by infusion becomes a syntactic foam core having a curved shape as the resulting product of the process. Upon removal of such product 38 from the curved surface 24 as diagrammed in FIG. 6, it is suitable for further fabrication into composite components associated with structure having complex, curved shapes.

Figure 6:
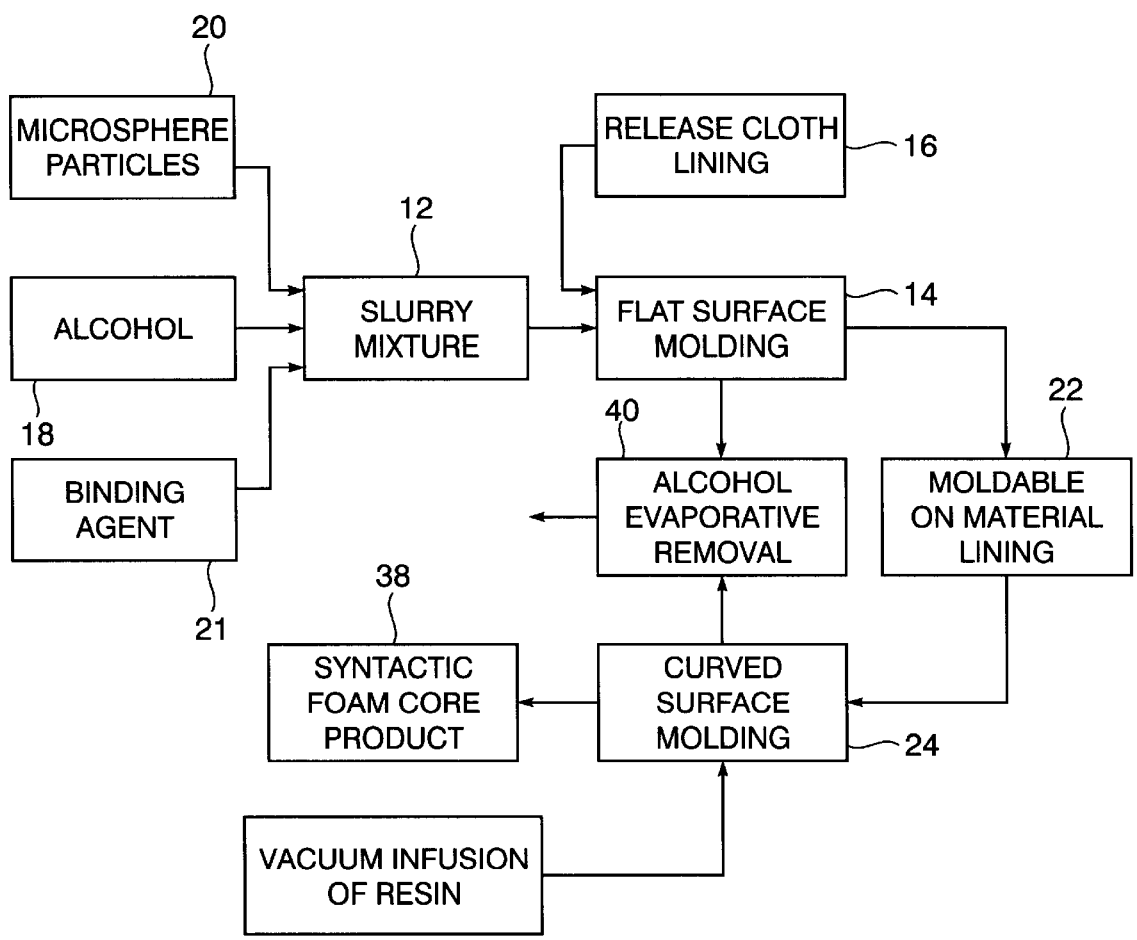
FIG. 6 is a block diagram schematically depicting the molding process associated with FIGS. 1–5.

FIG. 6 diagrammatically summarizes the process for producing the foam core product 38, including the initial step of formulating the slurry mixture 12 from the alcohol 18, the particles 20 and the binding agent 21 utilizing the mixing procedure hereinbefore described. The slurry mixture 12 is then poured into the mold 14 lined on its flat bottom surface with the release cloth 16, for partial solidification into the core material 22 after removal of some of the alcohol therefrom by evaporation 40 as diagrammed in FIG. 6. The core material 22 removed from the mold 14 with its bottom lining 16 is then inverted and transferred to the curved molding surface 24 for further molding while removal of the alcohol therefrom is completed by evaporation 40, followed by filling with resin by infusion to produce the curve-shaped, foam core composite product 38.

Obviously, other modifications and variations of the present invention may be possible in light of the foregoing teachings. It is therefore to be understood that within the scope of the appended claims the invention may be practiced otherwise than as specifically described.

What is claimed is:

1. In a molding process for synthesizing a curve-shaped product from a slurry, the improvement residing in the steps of: initially depositing said slurry onto a flat molding surface for partial solidification into core material having flexible, non-cracking properties; transferring said core material from the flat molding surface to a curved molding surface to undergo shape molding into said curve-shaped product; and infusing resin to fill the partially solidified core material during said shape-molding thereof on the curved molding surface.

2. The improvement in claim 1, including the steps of: lining the flat molding surface with a release agent prior to said depositing of the slurry thereon; and removing alcohol by evaporation from the slurry during said partial solidification thereof and from the core material while undergoing said shape-molding.

3. The improvement as defined in claim 2, wherein said release agent is a lining cloth on which said transferring of the core material from the flat molding surface is effected, and including the step of: inverting the core material for exposure of the lining cloth thereon when the core material is placed on the curved molding surface.

4. The improvement as defined in claim 3, including the steps of: removing alcohol by evaporation from the slurry during said partial solidification thereof and from the core material while undergoing said shape-molding on the curved molding surface.

5. The improvement as defined in claim 1, including the steps of: lining the flat molding surface with a release cloth on which said transferring of the core material from the flat molding surface is effected, and including the step of: inverting of the core material for exposure of the lining cloth thereon when the core material is placed on the curved molding surface.

* * * * *